April 15, 1941.  F. E. JOHNSON  2,238,848
FASTENER MEMBER
Filed March 24, 1938
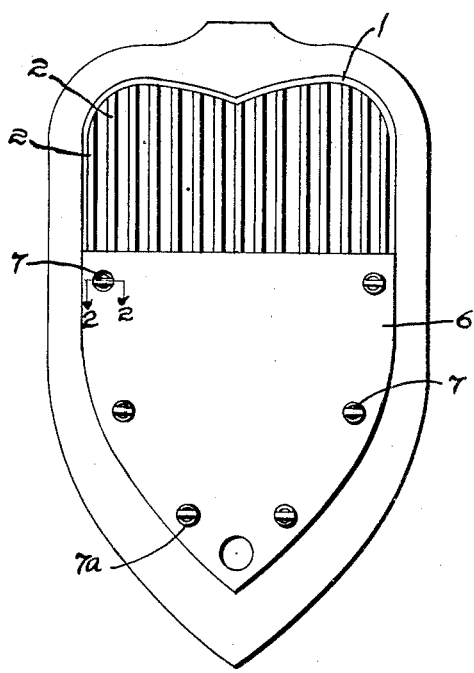
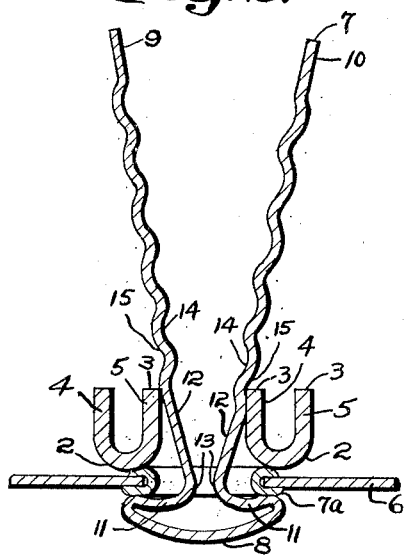
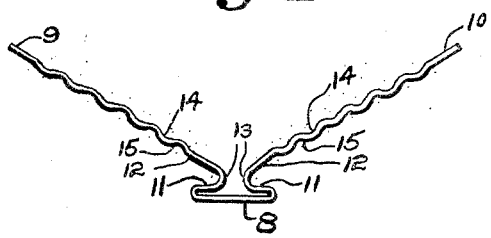
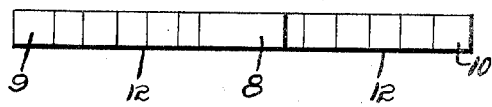
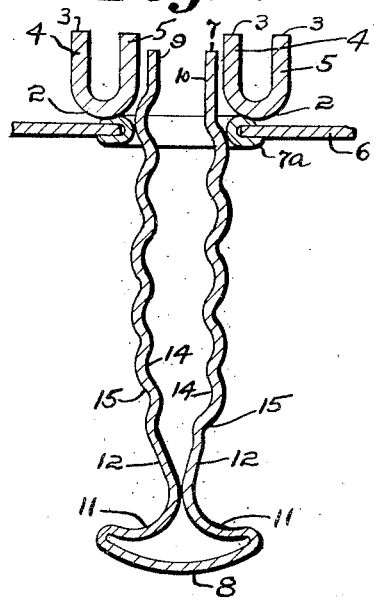
Inventor:
Frank E. Johnson.
by Walter S. Jones
Atty.

Patented Apr. 15, 1941

2,238,848

UNITED STATES PATENT OFFICE 2,238,848

FASTENER MEMBER

Frank E. Johnson, Malden, Mass., assignor to United-Carr Fastener Corporation, Cambridge, Mass., a corporation of Massachusetts Application March 24, 1938, Serial No. 197,807

2 Claims. (Cl. 24—213)

My invention relates particularly, though not exclusively, to an improved fastener for automobile radiator grille covers and installations thereof.

One of the chief objects of my invention is the provision of a grille fastener which is universal to most of the automobile grilles of the various manufacturers.

Other objects and purposes of my invention will be apparent from inspection of the drawing and specification herein set forth.

Referring to the drawing, in which I have illustrated a preferred embodiment of my invention:

Figure 1 is a front view of a radiator grille installation showing a use of my improved fastener members;

Fig. 2 is an enlarged section taken along the line 2—2 of Fig. 1;

Fig. 3 is a section similar to Fig. 2 showing the manner in which my fastener member is assembled with the radiator grille;

Fig. 4 is a front plan view of my improved fastener member per se; and

Fig. 5 is a top view of the fastener member shown in Fig. 4.

The object of my invention is to provide a new and improved fastener member for use in securing a flexible cover to an automobile radiator grille. My improved fastener is extremely simple and inexpensive to manufacture and combines firm holding qualities with adaptability to grilles having grille bars which are at varying distances apart and of varying thicknesses or depths.

Referring to the drawing, I have shown a radiator grille 1 having a plurality of grille bars 2. Each of the grille bars is of a construction now in common use being substantially U-shaped in cross-section and having free edges 3 at the rear ends of the oppositely-disposed side walls 4 and 5. An apertured flexible cover 6 is secured to the grille 1 by means of my improved fastener members 7 which have a head portion disposed on the outside surface of the apertured cover 1 and yieldable support-engaging legs extending through the apertures in the cover to engage a pair of adjacent bars of the grille, as most clearly shown in Fig. 2. In my preferred installation I have employed grommets 7a to reinforce the apertures of the flexible covers.

Referring in detail to my improved fastener members, I have shown one which is preferably made of one-piece spring metal. The fastener member in my preferred form has a base 8 which is normally straight, as shown in Fig. 5. A pair of yieldable legs 9 and 10 extend outwardly from one side of the base for engagement with a pair of adjacent grille bars 2—2. The legs 9 and 10 have inwardly-extending portions 11—11 substantially parallel with the base 8 and extending inwardly from adjacent opposed edges of the base and substantially straight support-engaging or end portions 12—12 extending outwardly in angular relation to the inwardly-extending portions 11—11. The ends 12—12 normally extend away from each other in diverging relation so as to form a relatively wide angle one to another, as best shown in Fig. 4. As a result of this construction, reverse bend portions 13—13 are formed at the junction of the ends 12—12 with the inwardly-extending portions 11—11 so as to increase the yieldability of the legs for a purpose to be described (Fig. 4). In my preferred form of fastener member I have formed a number of corrugations 14 running transversely of the inner surface of the ends 12—12 thus providing outwardly-extending shoulders 15 on the outer side of each of the corrugations at their ends nearest the base 8. It will be noticed that the shoulders 15 of the respective legs 9 and 10 extend outwardly one from another and, in my preferred form, are disposed on the legs in such a way that the shoulders of the respective legs are in staggered relation one to another when the legs have been contracted into substantially parallel relation, as shown in Fig. 3. As a result of the staggered relation of the shoulders of the legs 9 and 10, the fastener member presents an increased number or closer adjustment of support-engaging points in view of the fact that the engagement of a shoulder 15 of one of the legs only is sufficient to secure the fastener member rigidly to the grille.

One method of attaching the cover to the grille is to move the covering material 6 up to the grille bars with the grommet 7a substantially opposite the space between adjacent bars 2—2. Next, the legs 9 and 10 of the fastener member are contracted by the fingers of the operator so as to be in substantially parallel relation and the outermost free ends of the legs are inserted into the grommet, as most clearly shown in Fig. 3. Finally, the legs 9 and 10 are extended through the grommet until the inwardly-extending portions 11—11 of the legs abut the outer surface of the grommet. When the fastener member is in this position the legs 9 and 10 expand to engage a shoulder 15 of one of the legs 9 and 10 behind the free edge 3 of a side wall of one of the grille bars to secure the fastener member to the grille, as most clearly shown in Fig. 2. The outer surface of a corrugation of the other leg engages a side wall of the other grille bar, but not at a shoulder of the corrugation. When the legs are moved toward each other into contracted position, as shown in Fig. 3, the base 8 is bowed slightly and the tendency of the base to straighten out into normally straight position, coupled with the resiliency provided by the reverse bend portions 12—12 each of the legs, causes the legs to spring away from each other toward normal expanded position after being moved through the grommet so as to engage the grille bars 2—2 under considerable spring tension. Thus it has been found that the engagement of a shoulder of one leg only behind the free edge of one of the side walls of a grille bar is sufficient to secure rigidly the fastener member to the grille. It is obvious that the contemporaneous engagement of a pair of opposed shoulders 15 of the legs 9 and 10 behind the free edges 3 of the inner side walls 5 and 4 of respective adjacent grille bars would provide an even more secure fastening, but, as previously set out, such action is not necessary for the purpose of effecting an efficient and completely satisfactory fastener device for the described purpose. As a result of the fact that a plurality of shoulders 15 have been formed on each of the shoulders 9 and 10, it is possible for the legs to be engaged with grille bars having varying dimensions, such as presented by the radiator grilles of different automobiles.

Another feature of my improved fastener is that it is self-retaining on the grille cover once the legs are passed through the grommet 7a.

Although I have illustrated and described a preferred embodiment of my invention, I do not wish to be limited thereby because the scope of my invention is best defined by the following claims.

I claim:

1. A fastener for attaching an apertured member to a support composed of spaced bars and the like, said fastener being formed of resilient sheet metal of greater width than thickness and comprising an elongated base having reversely bent ends extending toward each other and succeeding reversely bent portions extending outwardly in widely divergent relation providing opposed coplanar attaching legs of substantially greater length than said base, said legs being adapted for engagement with the adjacent sides of adjoining supporting bars and at least one of them being provided with a series of deformations throughout a substantial portion of its length for cooperative engagement with a bar, the free ends of said legs being spaced apart a distance greater than the length of said legs to insure a high tensional engagement between said legs and bars, said fastener being readily attached to and detachable from said bars by a direct axial pressure applied to said base.

2. A fastener for attaching an apertured member to a support composed of spaced bars and the like, said fasteners being formed of resilient sheet metal of greater width than thickness and comprising an elongated base having reversely bent ends extending toward each other and succeeding reversely bent portions extending outwardly in widely divergent relation providing widely divergent attaching legs of substantially greater length than said base, said legs being formed with a series of deformations throughout a substantial portion of the length thereof for engagement with the adjacent sides of adjoining supporting bars, the ends of said legs being spaced apart a distance greater than the length thereof and many times greater than the spacing between adjacent sides of adjoining supporting bars to insure tensional engagement between said legs and adjacent supporting bars, said elongated base being resilient and adapted to be flexed outwardly as said legs are moved from their normal widely divergent relation to a less divergent relation whereby additional tension is provided for maintaining said legs in holding engagement with said adjoining bars.

FRANK E. JOHNSON.